United States Patent [19]

Zuev

[11] Patent Number: 5,448,664
[45] Date of Patent: Sep. 5, 1995

[54] OPTICAL GATES WHERE OUTPUT SIGNAL INTENSITY IS INDEPENDENT OF PHASES OF INPUT SIGNALS

[75] Inventor: Michael Zuev, San Jose, Calif.

[73] Assignees: Alexander Shkolnik, San Mateo; Lev Klebanov, San Jose, both of Calif. ; a part interest

[21] Appl. No.: 989,636

[22] Filed: Dec. 11, 1992

[51] Int. Cl.$^6$ .............................................. G02B 6/14
[52] U.S. Cl. ..................... 385/28; 359/332; 385/1; 385/14; 385/122
[58] Field of Search .................. 385/1, 4, 5, 14–16, 385/24, 27, 28, 30, 122, 129; 359/326–332

[56] References Cited

U.S. PATENT DOCUMENTS

| | | | |
|---|---|---|---|
| H1296 | 4/1994 | Simmons et al. | 385/16 |
| 3,660,673 | 5/1972 | Anderson | 359/330 |
| 3,772,528 | 11/1973 | Anderson | 359/332 |
| 4,776,658 | 10/1988 | Normandin | 385/28 |
| 4,932,739 | 6/1990 | Islam | 385/15 X |
| 4,938,557 | 7/1990 | Blow | 385/45 |
| 4,938,561 | 7/1990 | Grasso et al. | 359/341 |
| 5,283,843 | 2/1994 | Olmstead | 385/16 |

OTHER PUBLICATIONS

M. Zuev & A. Shvartsburg, "Quasi–dynamic modelling for non–linear evolution of short pulses", 7 *Computer Optic* (Moscow) 72–81 (1990). (No Month), (No Translation).

*Primary Examiner*—John D. Lee
*Attorney, Agent, or Firm*—David Pressman

[57] ABSTRACT

A method for amplifying optical signals without dependence of output signal intensity on an input-signal phase is provided. This method is based on nonlinear interaction of three phase-synchronized modes in one core of a waveguide. The method may be realized by passing the above-mentioned signals through an optical element with a waveguide (200) having pulse interaction and propagation portions (205 and 207) which receive impulses in first and second coherent waveguide modes which cause a nonlinear interaction between the first and second waveguide modes and generate a third waveguide mode. This third mode is phase-synchronized with the first and second waveguide modes. The method may be realized in optical amplifiers, switches, as well as logical optical AND gates, OR gates, etc. An optical OR gate which realizes the above principle consists of an input portion (201), a core expansion portion (202) which in addition to the first waveguide mode allows the appearance of a second waveguide mode and a third waveguide mode, a linear mode conversion portion (203), an input impulse portion (204), a first nonlinear interaction and propagation portion (205), a third-mode elimination portion (206), a second nonlinear interaction and propagation portion (207), and an output portion (208, 209) which produces an amplified impulse in a first waveguide mode. Logical AND gate also is described. The elements can be represented in the fiber-optic or integrated-optic version.

14 Claims, 8 Drawing Sheets

OPTICAL GATES WHERE OUTPUT SIGNAL INTENSITY IS INDEPENDENT OF PHASES OF INPUT SIGNALS

BACKGROUND—FIELD OF THE INVENTION

The present invention relates to the field of optical signal processing and amplification, particularly to such optical signal processing which is independent of the input signals' phases. More specifically, the invention relates to optical logical elements based on such optical signal processing.

BACKGROUND—DESCRIPTION OF PRIOR ART

At present electronic logical elements find wide application in various devices, from domestic appliances to sophisticated supercomputers. The durations of various logical operations in electronic circuits has minimum physical limits, which in general are on the order of microseconds and in some cases on the order of nanoseconds. Nevertheless, some special or critical situations require that real-time control of missiles, satellites, nuclear reactors, etc., be carried out with operational speeds much higher than those attainable with existing up-to-date electronic logical elements and switches.

In optical systems a pulse duration may be as short as 10 picoseconds, which is beyond anything which has been achieved in electronic systems. Thus, there have been many attempts to create an optical computer, i.e., a computer in which signals are processed by optical devices. The essential parts of such a computer are optical amplifiers, optical logical elements, and optical switches.

In all signal-processing circuits, input signals come from different points of a signal-generating system. In contrast to electronic systems, where the phases of such input signals can be easily controlled, in optics such control is practically impossible. This is because in optics, the phases of signals change at distances on the order of microns, so that even slight variations in the physical conditions of the circuits lead to total uncertainty of the phases of the input signals. Thus, one of the most important requirements for optical logical elements is that the output signal be independent of the input signal's phase.

One attempt to develop an optical switch is disclosed in U.S. Pat. No. 4,938,557, issued Jul. 3, 1990 to K. Blow. Blow's optical switch comprises a section of an optical fiber consisting of a core and a cladding which form a waveguide. Two different signals are supplied to the waveguide. The switch operates so that when the sum of intensities of the first and second signals has an intensity above a certain threshold, the device is capable of operating as a waveguide, and when the intensity is below the threshold, the sum signal intensity drops to a magnitude practically close to zero. Though Blow makes reference to the fact that components of the signal must be phase aligned, such a condition can be realized in the proposed device only under specific laboratory conditions. As mentioned, even the slightest variations in the conditions of the system will unpredictably change the input signal's phase.

Other attempts to develop an optical signal-handling device, such as an optical amplifier, are based on a combination of linear and nonlinear interactions of optical signals. Thus, U.S. Pat. No. 4,938,561, issued Jul. 3, 1990 to G. Grasso et al., describes an optical amplifier which consists of two single-mode cores, which are located physically close to each other, and a common cladding which surrounds the cores. The optical characteristics of the cores are different, so that they form two guidance paths having different propagation constants. Such a device makes it possible to amplify optical signals, provided that a certain combination of parameters is fulfilled. However, as the previous optical switch, this amplifier does not solve the problem of dependence of amplification on the input signal phase. Such dependence is typical and intrinsic to any signal processor which has a combined linear-nonlinear interaction. Due to this dependence, it is necessary to tune the signal's and the pump's phases, which is not realistically possible with optical signal-handling systems.

Another way to avoid the problem of dependence of amplification on the input signal's phase is to use different frequencies for the signal and pump pulses. However, use of such different frequencies leads to many other problems, including complication of the entire system, increase in manufacturing and operation costs, and, most important, instability of the system's operation.

Since all prior-art problems of known optical logical elements are inherent also in optical amplifiers and optical switches, in the subsequent text the term "optical logical element" will also cover terms "optical switch" and an "optical amplifier".

OBJECTS AND ADVANTAGES OF THE INVENTION

It is therefore an object of the invention to eliminate the above disadvantages and to provide a method of optical amplification of signals without dependence of the output signal's intensity on the input-signals's phase. Another object is to provide an optical logical element which has a speed of operation on the order of tenth of picoseconds, which does not depend on the variation of physical conditions of circuits, which ensures independence of the output signal from the input signal's phase, which is suitable for use under real, non-laboratory conditions, and which does not require different signal and pump pulse frequencies.

Other advantages and features of the invention will become apparent from a consideration of the ensuing description and drawings.

REFERENCE NUMERALS USED IN THE DRAWINGS AND DESCRIPTION

22—optical waveguide
24—cladding portion
26—core portion
28—input single-mode waveguide
30—output single-mode waveguide
101-105, 108, 109—sequential sectors of single-stage OR gate
200—two-stage OR gate
201-209—sequential sectors of two-stage OR gate
300—two-stage amplifier
301-309—sequential sectors of two-stage amplifier
400—non-amplifying AND element
400a and 400b—input sectors of 400
410 to 419—component sectors of 400

DETAILED DESCRIPTION OF APPARATUS OF THE INVENTION—GENERAL CONCEPT

I conducted multiple experiments with optical waveguides aimed at finding the way to make an output signal of an optical logical element independent of the input signal's phase. While conducting these experiments, I unexpectedly found that the above requirement is fulfilled when three phase-synchronized waveguide modes nonlinearly interact in a single fiber core.

In the description and claims of the present invention the term "mode" means "waveguide mode". In general, where I mention a three-mode core, I assume that many modes may propagate through this core, but only three of them participate in the above-mentioned nonlinear phase-synchronized interaction. Similarly, when I mention two-mode or single-mode cores, I understand that more then one or two modes may propagate through these cores, but only two or one of them correspond to the above three phase-synchronized modes. For the simplicity of description, herein and hereafter the terms "single-mode", "two-mode", and "three-mode" will be used without mentioning the presence of other noninteracting modes.

While I do not yet fully understand the physical theory behind the phenomenon, the following theoretical explanation and the results of a numerical analytical simulation which I conducted may be helpful in understanding the construction of the optical logical devices and processes which occur therein.

Figure 1:
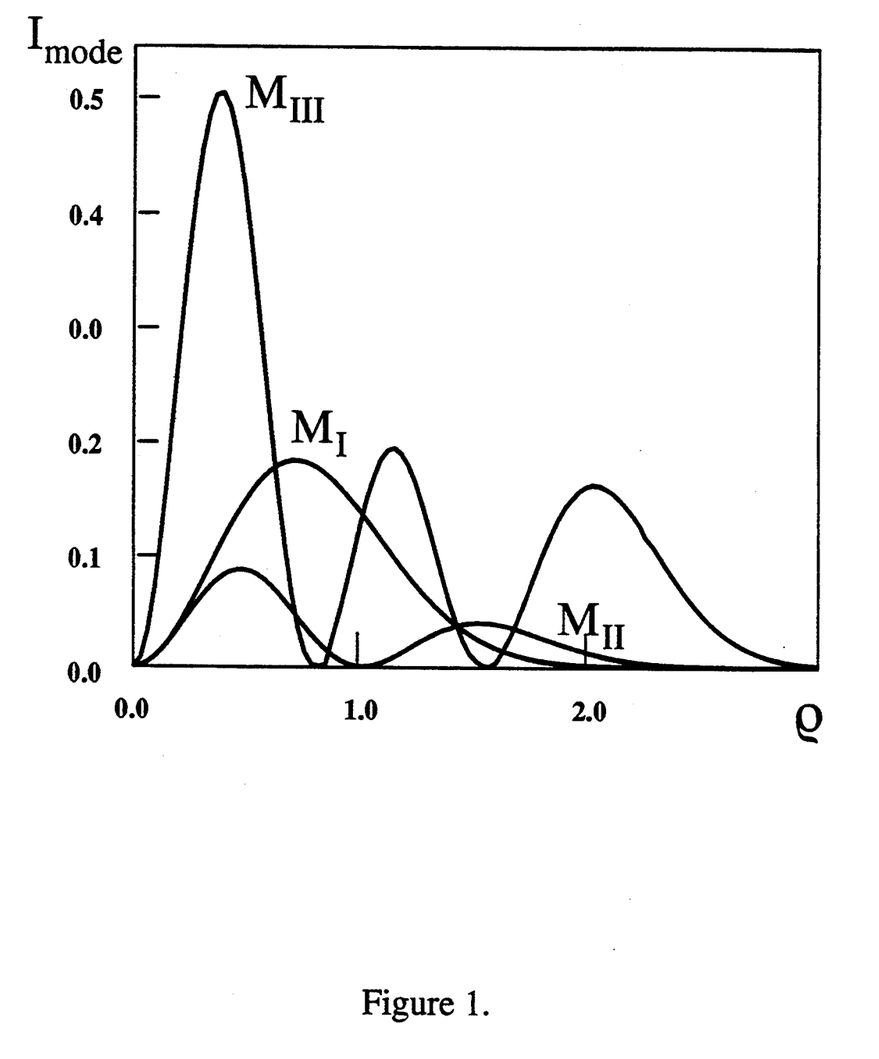
FIG. 1 is an example of three different patterns of intensity distribution over the cross section of a light waveguide.

FIG. 1—Three-Mode Nonlinear Interaction Theory

When light propagates along an optical waveguide, it decomposes into a certain number of components having different modes of an electric field E which is expressed by the following formula $$E = E_0 \cdot \sum_{m=1}^{3} f_m(z) \cdot \vec{e}_m(\vec{r}_\perp) \cdot \exp(ik_m z - i\omega t), \quad (1)$$

where $E_o$ is an amplitude of a complete electric field, m is a mode index which may have a value from 1 to 3, $f_m$ is a mode amplitude, z is a coordinate in the longitudinal direction of the waveguide, $\vec{e}_m$ is a mode vector, $\vec{r}_\perp$ is a vector radius in a cross section of the waveguide, i is an imaginary unit, $k_m$ is a propagation constant, $\omega$ is frequency of the light, and t is a current time. Those characters with superior arrows are vectors and the "$\perp$" sign indicates a perpendicular vector.

Each mode is characterized by an unique speed of propagation in the axial direction of the waveguide and an unique intensity distribution pattern in the transverse cross section of the waveguide. The former depends on $k_m$ and the second is shown in FIG. 1, which illustrates a specific example of intensity distribution patterns over the radius of a core. In this drawing, there are three intensity distribution modes: MI, MII, and MIII, wherein distribution mode MI has one peak, distribution mode MII has two peaks, and distribution mode MIII has three peaks. In general, however, it is important that modes MI, MII, and MIII have different number of peaks—not necessarily, one, two, and three peaks.

I assumed that in order to achieve the objects of the invention it is necessary to select modes having phase synchronism between the propagation constants, i.e., $k_1 + k_3 = 2k_2$.

It is known that a majority of nonlinear phenomena are described by the traditional Kerr-type effect as follows [see references mentioned above]: $n = n_o(r) + \delta n^{nl} \times I$, where $n$ = full profile of refractive index, $n_o$ = non-disturbing profile of refractive index, $\delta n^{nl}$ = Kerr coefficient of nonlinear response, and $I$ = light intensity.

Therefore for each mode amplitude ($f_1$, $f_2$, $f_3$ [see formula (1)]) equations evolve as follows:

$$L \frac{df_1}{dz} = i \cdot (R_{11}|f_1|^2 + R_{12}|f_2|^2 + \quad (2)$$
$$R_{13}|f_3|^2) \cdot f_1 + iR_0 \cdot f_2^2 \cdot f_3^*$$

$$L \frac{df_2}{dz} = i \cdot (R_{21}|f_1|^2 + R_{22}|f_2|^2 +$$
$$R_{23}|f_3|^2) \cdot f_2 + 2iR_0 \cdot f_1 \cdot f_2^* \cdot f_3$$

$$L \frac{df_1}{dz} = i \cdot (R_{31}|f_1|^2 + R_{32}|f_2|^2 +$$
$$R_{33}|f_3|^2) \cdot f_3 + i \cdot R_0 \cdot f_2^2 \cdot f_1^*$$

where $f_{1,2,3}^*$ and $f_{1,2,3}$ are a conjugate pair and L is a characteristic length of nonlinear selfinteraction, i.e., the length where intensity of the first mode increases by several times due to interaction with itself. Coefficients $R_{mn}$ are defined by integrals of the overlap of modes m and n (where m and n have values from 1 to 3), i.e., of those portions of FIG. 1 where intensity distribution patterns MI, MII, and MIII overlap; $R_o$ is determined as an overlap integral of all three modes; here and hereinafter, two-digit subscripts, except for those including 0, designate combinations of modes, e.g., 32 corresponds to the interaction between mode MIII and mode MII.

L and R can be calculated using methodology for the modes of arbitrary structure described by M. Zuev and A. Shvartsburg in "Quasidynamic Modelling of Short Pulses Nonlinear Evolution", Computer Optics, Vol. 7, pp. 72-81, Moscow, 1990.

Numerical simulation of the system of formula (2) confirms that the output intensity of signals does not depend on the input signal's phase. The final proof of this statement was obtained by subjecting the system of formula (2) to the analytical analysis. In this analysis, the solution for mode intensities $W_m |f_m|^2$ was expressed as follows:

$$2W_1 = W_2 = D_1; 2W_3 + W_2 = D_3; \quad (3)$$

-continued $$\left(L \cdot \frac{dW_2}{dz}\right)^2 = 4R_0^2 W_2^2 (D_1 - W_2)(D_3 - W_2) -$$

$$(A \cdot W_2^2 + B \cdot W_2 + C)^2;$$

$$A = \frac{1}{4} (2R_{12} - R_{11} - R_{13} + 2R_{21} - 4R_{22} +$$

$$2R_{23} + 2R_{32} - R_{31} - R_{33});$$

$$B = \frac{D1}{2} (R_{11} - 2R_1 + R_{31}) + \frac{D3}{2} (R_{13} - 2R_{23} + R_{33});$$

$$C = 4R_0 \sqrt{W_{10} \cdot W_{20}^2 \cdot W_{30}} \cdot \cos(\phi_{10} - 2\phi_{20} + \phi_{30}) -$$

$$A \cdot W_{20}^2 - B \cdot W_{20}$$

where the constant values $D_1$, $D_3$, A, B, C are expressed by the mode-overlap integrals $R_{mn}$ and $R_o$. In this solution, $W_{mo}$ and $\phi_{mo}$ are the initial intensities and phases of input modes (at z=0). As can be easily seen from formulae (3), if there is no input for the third mode ($W_{30}$=0), the amplification of the first mode does not depend on its initial phase $\phi_{10}$ [see the definition of parameter C in formula (3)].

Assume a weak signal (mode 1) and a more powerful signal, known as a pump signal (mode 2), and which is used as a source of power for amplifying the above-mentioned weak signal. The physical principle here is that a pure two-mode nonlinear interaction cannot change the signal's amplitude; only its phase is changed. There are some factors which may work as catalysts of the first-mode amplification. The most effective of these factors are the following: linear periodical irregularity (e.g., in the form of periodically crimped cladding); linear interaction between neighboring cores; and the presence in the same core of a third mode which is involved in the nonlinear interaction due to phase synchronism.

As has been discussed above, the first and the second factors, i.e., a combined linear/nonlinear interaction, cannot provide independence of amplification from the input signal's phase. Such independence can be achieved only with the use of the third factor, i.e., the use of a third mode in the same core. This particular factor is the one on which the method and devices of the present invention are based.

FIGS. 3 through 8—Description of Optical Logical Elements

The method of the invention may be realized in the form of optical amplifiers, optical logical elements, etc.

Although some examples of such elements are given below, they do not limit the scope of the invention and that many other devices and their combinations are possible within the scope of the appended claims.

Figure 2:
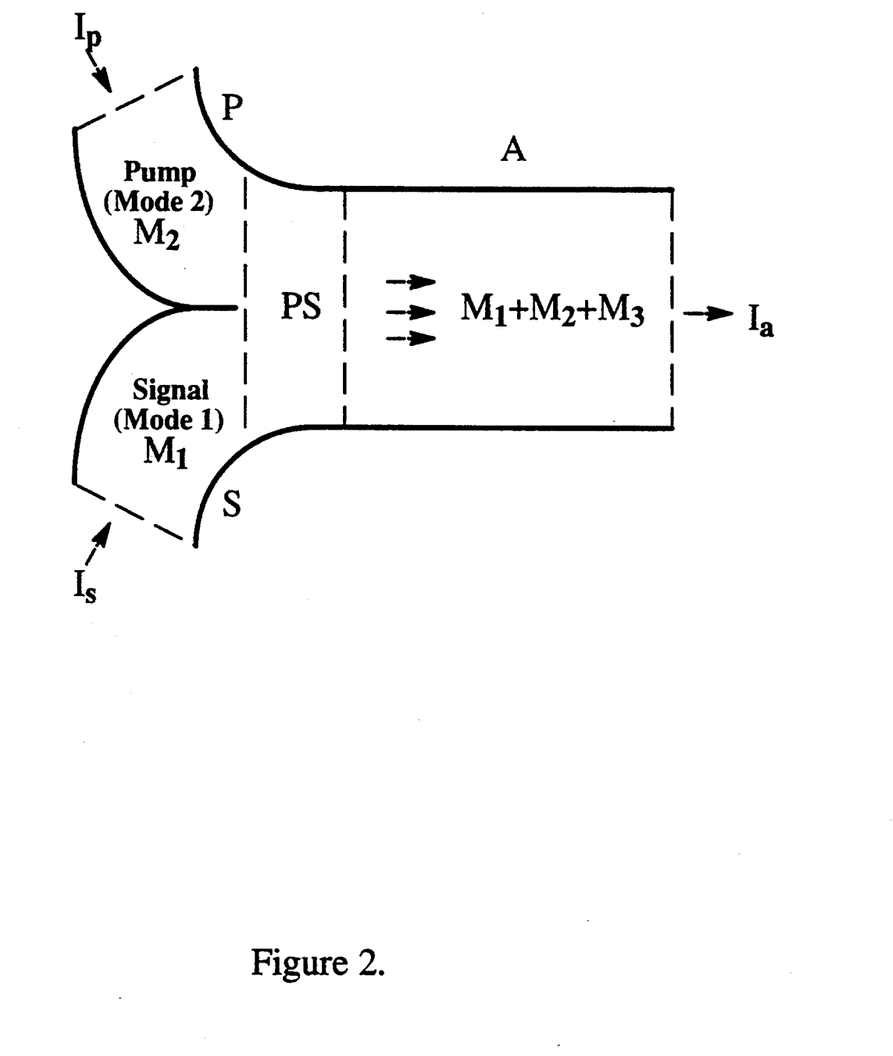
FIG. 2 shows an elementary optical amplifier based on the principle of the invention.

FIG. 2—Single-Stage Amplifier

FIG. 2 shows an elementary optical amplifier based on the principle of the invention.

The amplifier of FIG. 2 comprises a section of an optical waveguide in the form of two branches, i.e., a pumping branch P and an input signal branch S, which merge into an amplification section A. Pumping branch P supplies a pumping impulse $I_p$ in mode MII. Pump impulse $I_p$ is a power pulse which propagates along an optical waveguide (not shown), e.g., from an external laser-energy source, (not shown) to pumping branch P. Signal branch S supplies an input signal pulse $I_s$ in mode MI. Input signal pulse $I_s$ has a weaker power and propagates along its own optical waveguide (not shown).

Such an amplifier may find its application in various optical circuits, e.g., in satellite communication systems.

As will be shown later, this optical amplifier, as well as optical gates of the invention, may be realized in a fiber-optic or integrated-optic implementation with the use of opto-electric techniques.

The waveguide of the amplifier may have a length of about 10 cm in integrated-optic implementation and a length of about 100 m in fiber-optic implementation.

FIG. 2—Operation of a Single-Stage Amplifier

The single-stage amplifier of FIG. 2 operates as follows:

Pump pulse $I_p$ is supplied from an external laser source (not shown) to pumping branch P. A weaker signal pulse $I_s$ is simultaneously supplied to signal branch S. On a short section PS, after the junction of branches P and S, both pulses $I_p$ and $I_s$ merge, and in the next section A they interact with the appearance of a third mode MIII. This interaction amplifies the intensity of mode MI. Pulses $I_p$ and $I_s$ have durations on the order of 10 ps. Here and hereafter the pumping pulse or signal and input pulse or signal are coherent.

Mode MIII, involved in the nonlinear interaction in section A, works as a catalyst for pulse amplification in mode MI. As a result, the amplifier produces on its output an amplified signal $I_a$ which does not depend on the input signal phase $\phi_{10}$ [see explanation to formula (3) above].

This is an unexpected synergistic effect which I have found and used as a basis for the development of optical amplifiers and optical logical elements.

Figure 3:
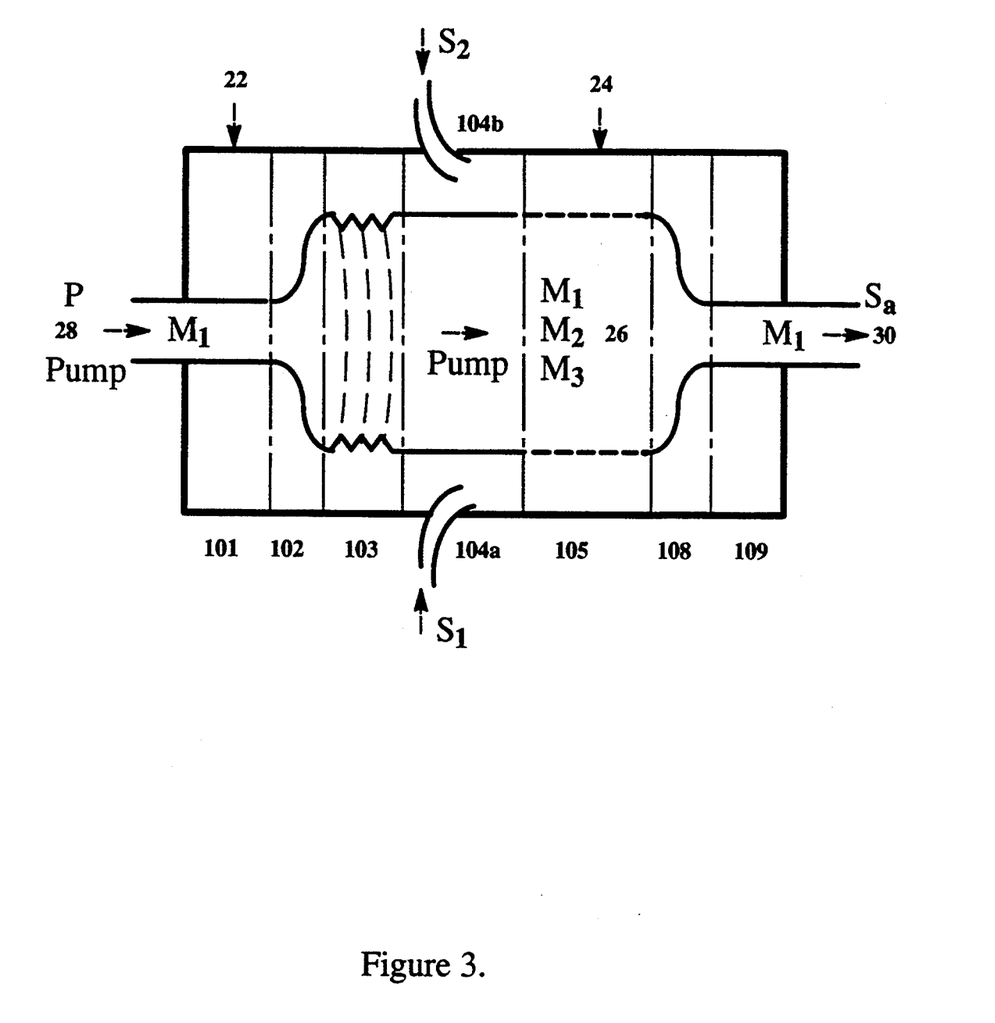
FIG. 3 is a schematic longitudinal sectional view of a single-stage OR gate of the invention.
Figure 4:
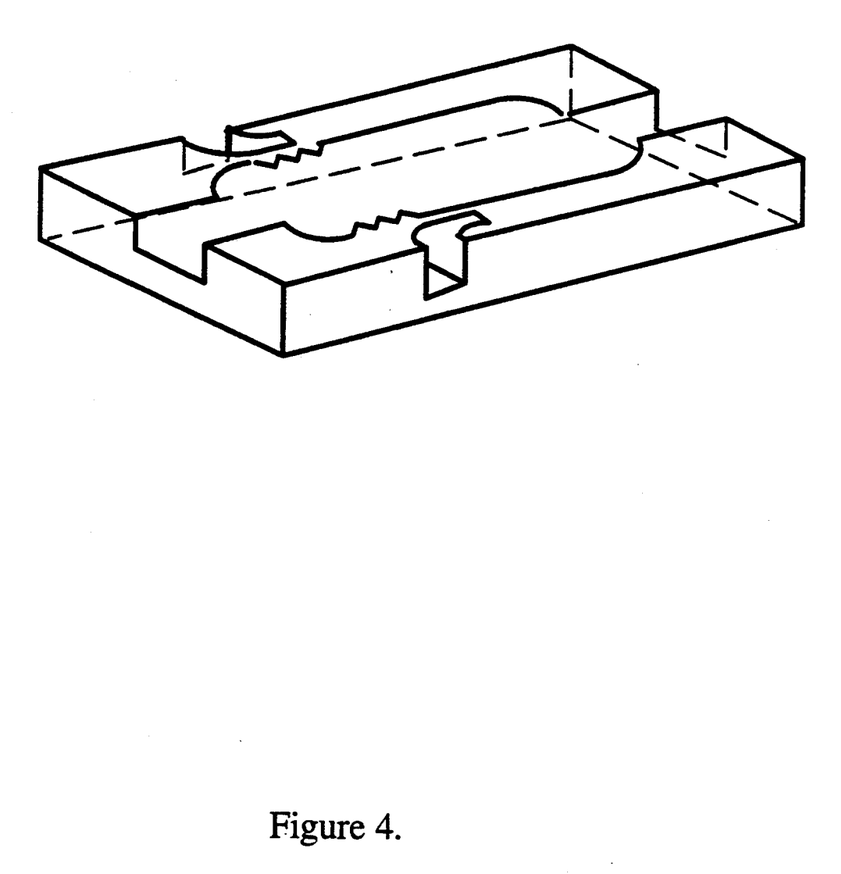
FIG. 4 is an integrated-optic implementation of the OR gate of FIG. 3.
Figure 5:
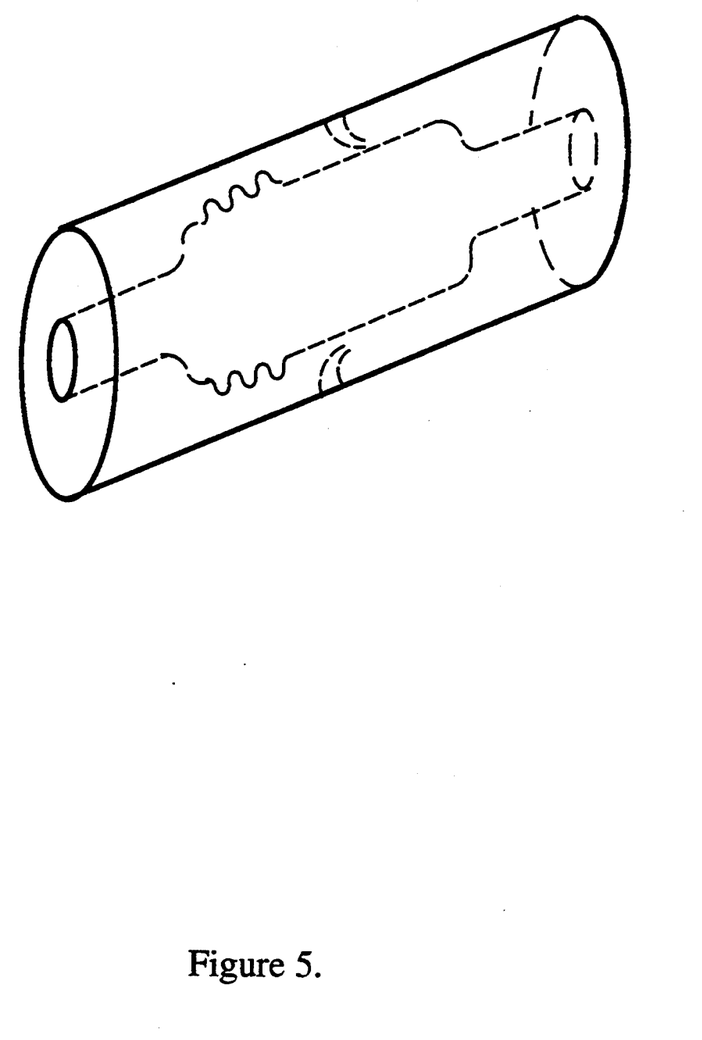
FIG. 5 is a fiber-optic implementation of the OR gate of FIG. 3.

FIGS. 3, 4, 5—Single-Stage OR Gate

FIG. 3 is a sectional view of a flat, single-stage, optical OR gate. This optical OR gate is a logical element an output signal of which exists with the existence of at least one of signals on its input. Signals propagates in the longitudinal direction of the gate of FIG. 4 which is a three-dimensional view of the gate as constructed from integrated optics.

The same OR gate, as well as all other subsequent amplifiers and optical logical elements, may be constructed and produced from fiber-optics, as shown in FIG. 5. It is understood that in the case of the fiber-optic implementation, all fiber optic elements will have the same cross-sectional configuration as integrated optic elements in respective sectional views similar to that of FIG. 3. Therefore the following description will be considered for both representations simultaneously.

The device shown in FIG. 3 comprises an optical waveguide 22 which consists of a cladding portion 24 and a core portion 26. Cladding portion 24 is made of a material having a refractory index lower than that of core 26.

In the case of a single-stage OR gate, waveguide 22 is divided into seven sequential sectors, described below.

Sector 101 receives the input of a pump impulse P from an input single-mode waveguide 28 which in turn receives this impulse, e.g., from a laser generator (not shown). Such a source may be a laser generator of relatively high power with the following characteristics of input pulses: 1 to 10 W for the fiber-optic representation and about 1 mW for the integrated-optic representation. The wavelength may be chosen in a wide range and may be, e.g., of about 1 μm. The pulse duration may be on the order of 10 picoseconds (ps).

In sector 102 core 26 expands for conversion of waveguide 22 from a single mode to a three-mode state.

Sector 103 is a pulse conversion portion intended for linear mode conversion to transfer pump impulse P from mode MI to mode MII (FIG. 1). In light-integration schemes, such a conversion is achieved by crimping the cross section of core 26 to the depth of several percent of the core diameter. In fiber design this can be achieved by periodically crimping the cladding.

Sector 104 has directional input branches 104a and 104b for supplying several signals from independent single-mode waveguides (not shown) into first mode MI of waveguide 22 which in sector 104 is in a three-mode state.

All preceding sectors 101 through 104 are auxiliary portions of waveguide 22 which are used for signal supply and conversion and which in integrated-circuit representation have a total length of about 1 cm.

Sector 105 is the main portion of waveguide 22 which serves for developing the main three-mode nonlinear interaction which has been described above with reference to formulae (1) to (3). In order to achieve maximum amplification, this sector should be substantially longer than the previous sectors, e.g., about 10 cm (in integrated-circuit representation).

Sector 108 is a mode discriminator for suppressing modes MII and MIII. Such a suppression may be easily carried out by sharply narrowing the core cross-sectional area to cut off modes MII and MIII and to leave mode MI alone. This is based on a relationship of the number of modes from the cross-sectional size of the core. In other words, if the diameter of the core is reduced, some higher modes will be cut off (will flow out into the surrounding space) and disappear.

Sector 109 is an output sector which supplies an output signal Sa to an output single-mode waveguide 30.

FIG. 3—Operation of Single-Stage OR Gate

The device of FIG. 3 operates as a conventional OR gate so that if no signals are supplied to the directional branches of sector 104, then no signals will appear on the device's output, i.e., on sector 109. If either of directional mode MI branches supplies a signal to sector 104, e.g., a weak signal S1 or S2 in mode MI, then an amplified signal $S_a$ will appear on the device output. If signals are supplied by both branches, the result will be the same.

A pumping pulse P is supplied to input sector 101 from the above-mentioned external source.

In sector 102, pumping pulse P is transferred from a single-mode core portion to a three-mode-core portion of waveguide.

In sector 103, a linear mode conversion takes place for the conversion of impulse P from mode MI to mode MII.

In sector 104, several signals are directionally supplied from independent single-mode waveguides (not shown) into mode MI of waveguide 22, which is in a three-mode state in sector 104.

In sector 105, the main three-mode nonlinear interaction takes place.

In sector 108 modes MIII and MII are suppressed by passing though a sharply narrowed portion. As a result, only mode MI remains.

In sector 109, the output signal $S_a$ is transferred to an output single-mode waveguide 30.

Thus, similar to the case of a single-stage amplifier, in the case of the single-stage OR element mode MIII, involved in the nonlinear interaction, works as a catalyst for pulse amplification in mode MI. As a result, the amplifying portion of the single-stage OR element produces on its output an amplified signal $S_a$ which does not depend on the input signal phases [see explanation to formula (3) above].

Figure 6:
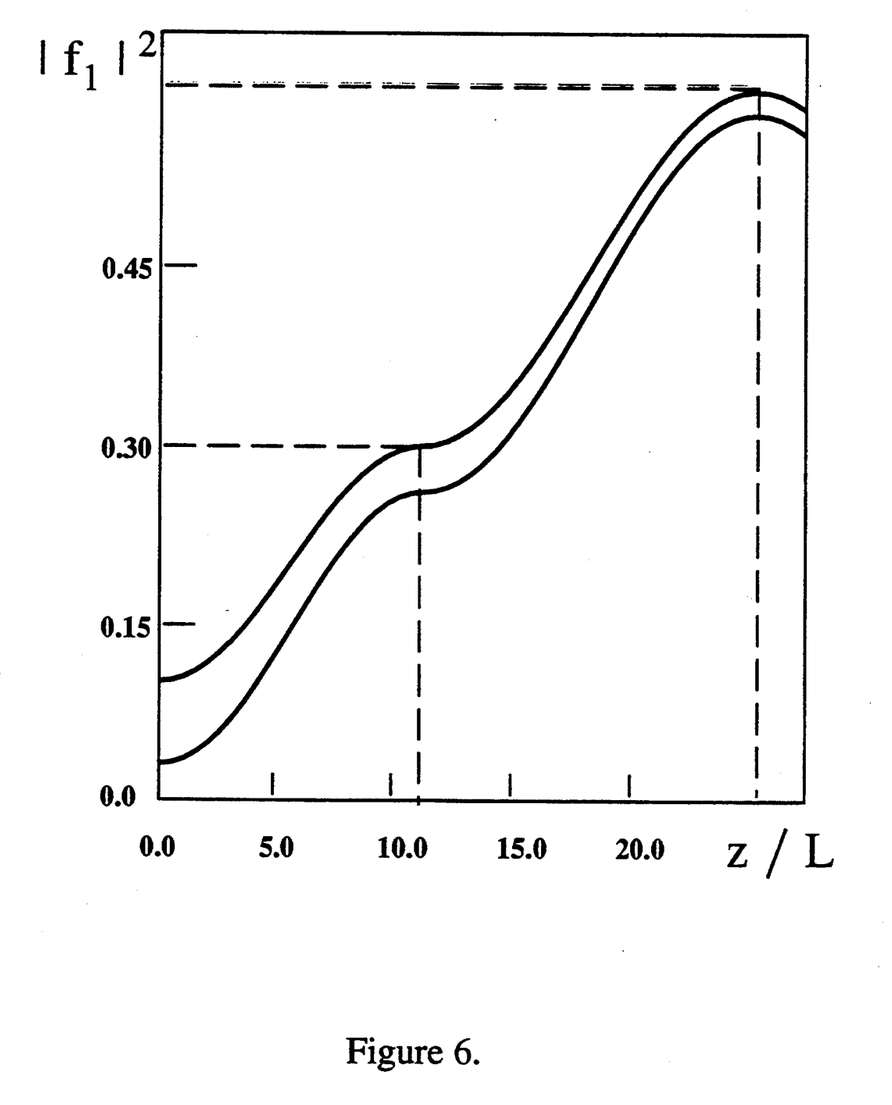
FIG. 6 is a graph illustrating a two-stage amplification in the gates of the invention.
Figure 7:
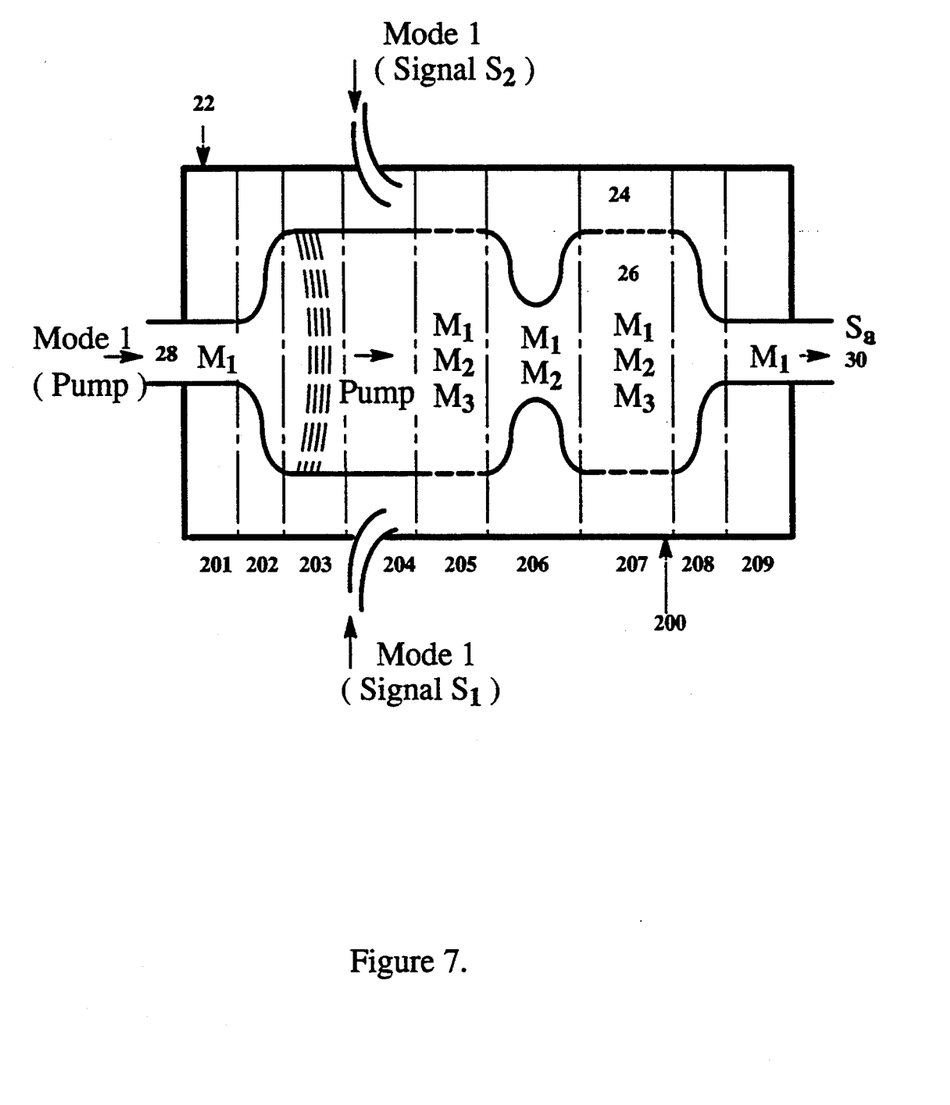
FIG. 7 is a schematic longitudinal sectional view of a two-stage OR gate of the invention.

FIGS. 6 and 7—Two-Stage OR Element

The devices shown in FIGS. 2 and 3 comprise a single-stage optical amplifier and OR gate, respectively. In these devices, the maximum signal amplification occurs at the end of sector 105. However, this maximum does not exhaust the pumping. If the length of sector 105 is increased, then nonlinear interaction between the mode MI, MII, and MIII will decrease the amplitude of mode MI, leaving mode MII unexhausted. This is because when mode MIII has accumulated sufficient power, i.e., continues to consume an effective part of pumping from mode MII, it produces a negative effect for mode MI. For this reason a second amplification stage is used.

FIG. 6 is a graph illustrating two-stage amplification in an optical gate of the invention. In this graph, the abscissa shows the length (z/L) of the waveguide (z and L are given above in the explanation of theory), while the ordinate shows intensity of the mode MI signal. A portion from 0 to 11 along the abscissa corresponds to a first amplification stage, which has been discussed above with reference to FIGS. 2 and 3.

A new increase of the mode MI intensity after the first maximum may be obtained by using the rest of mode MII, if mode MIII is suppressed. As has been mentioned above in the description of the single-stage OR gate of FIG. 3 (sector 108), the suppression of mode MIII may be provided by sharply narrowing the core. If the core's cross-sectional area is then expanded to its initial size, a second amplification stage of mode MI will be obtained. The second amplification stage corresponds to a portion from point 11 on the abscissa to point 26.

Two-stage amplification is optimal. The calculations show that the addition of a third amplification stage in the same manner will amplify a signal only for a few percent more because the pump power will practically exhaust at the end of the second stage.

FIG. 7 is a schematic longitudinal sectional view of a two-stage OR gate 200 which consists of nine sections 201, through 209.

In this device, sectors 201 through 205 and 208 and 209 are identical to sectors 101 through 105, 108, and 109 of the single-stage OR gate of FIG. 3. The only difference is that sectors 206 and 207 are added for the second amplification stage.

Sector 206 is a mode-discrimination portion used for suppressing mode MIII which appears in sector 205 as a result of nonlinear interaction. As has been mentioned above, this can be achieved by sharply narrowing the core on a short interval of its length, i.e., on sector 206. The previous dimensions of core cross-sectional area are restored in sector 207 which is identical to sector 205, i.e., it provides three-mode amplification which has been described above with reference to formulas (1) to (3). The length of this section is of the same order as that of sector 205.

FIG. 7—Operation of Two-Stage OR Gate

In the two-stage OR gate 200 of FIG. 7, sectors 201 through 205 operate in the same manner as sectors 101 through 105 of the single-stage OR gate of FIG. 3, respectively.

In sector 206 the MIII mode is cut off due to core 26 which is sharply narrowed in this sector. When the pulses then pass through sector 207, which has the previous three-mode cross-sectional configuration, MIII mode will reappear and acts as a catalyst for the MI-mode amplification. Thus, sectors 206 and 207 provide additional amplification without the use of an additional external pumping source.

The pulses pass through sectors 208 and 209, which, as has been mentioned above, function identically to sectors 108 and 109 of the single-stage OR gate.

The device of FIG. 7 operates as a conventional inclusive OR gate so that if no signals are supplied on directional branches of sector 204, then no signals will appear on the device's output, i.e., on sector 209. If either or both directional mode MI branches supply a signal to sector 204, e.g., a weak signal S1 or S2 in mode MI, then an amplified signal $S_a$ will appear on the device's output. In contrast to the single-stage OR gate, the two-stage element provides twofold or higher amplification.

Similar to the single-stage element, two-stage device 200 will operate with pulse durations on the order of 10 ps.

Thus, similar to the case of a single-stage OR gate, in the case of the two-stage OR gate the output signal does not depend on the input signal phase.

Figure 8:
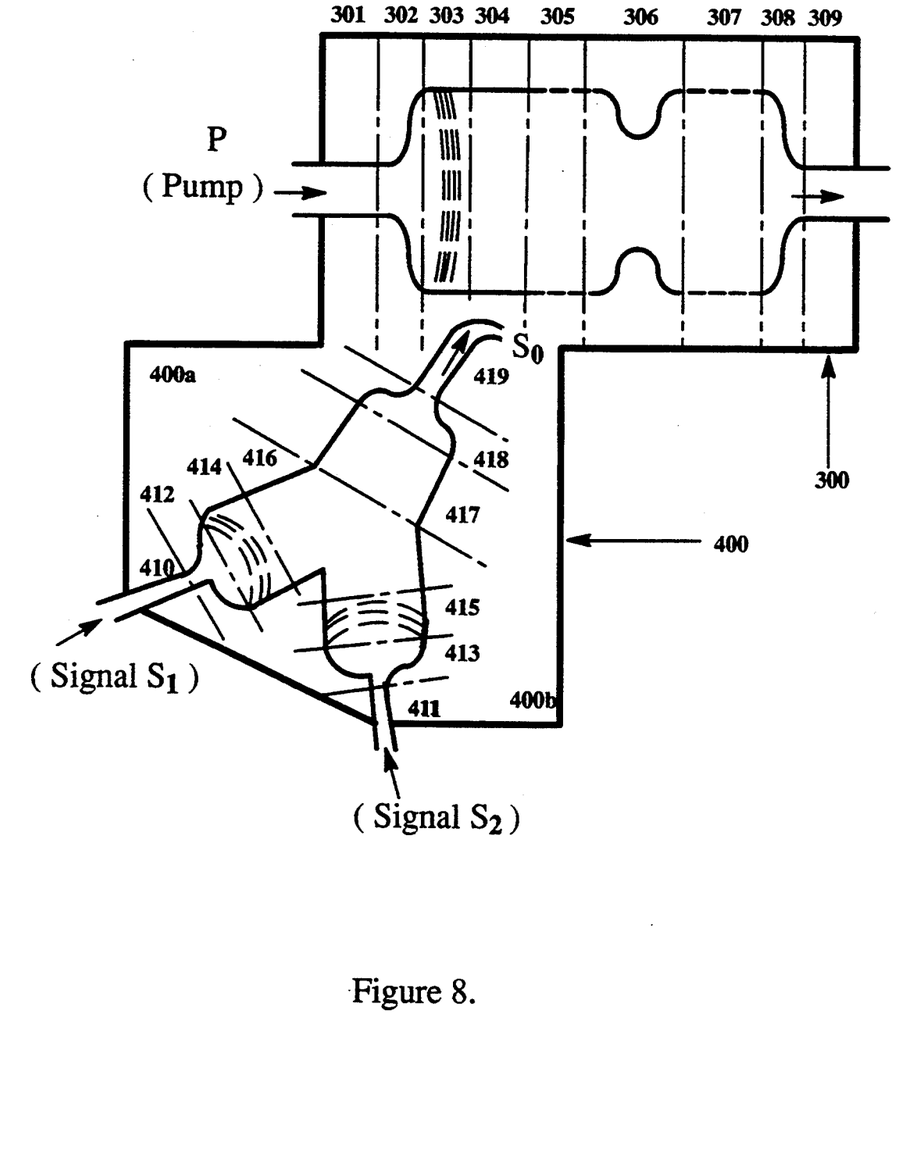
FIG. 8 is a schematic longitudinal sectional view of an AND gate based on the principle of the invention.

FIG. 8—AND Gate

FIG. 8 illustrates an AND gate based on the principle of the present invention. Basically, it consists of two parts, i.e., a two-stage amplifier 300 and a non-amplifying AND element 400.

Two-stage amplifier 300 is identical to OR gate 200 shown in FIG. 7, i.e., sectors 301 through 309 are identical to sectors 201 through 209 of two-stage OR gate 200. Two-stage amplifier 300 differs from two-stage OR gate 200 in that, instead of two input signals S1 and S2 in sector 204, amplifier 300 receives input signals from special non-amplifying AND element 400 which is an integral part of the entire AND gate.

Non-amplifying AND element consists of a first input sector 400a and a second input sector 400b which communicates, via a sector 416, with a sector 417.

Sectors 410 and 411 are identical to sector 101 and receive MI-mode signals S1 and S2.

Sectors 412 and 413 are identical to sector 102 and transform the cores of these sectors to a three-mode state.

Sector 414 is identical to sector 103 and provides linear conversion of signal S1 from mode MI to mode MII. Sector 415 is also identical to sector 103, but linearly converts signal S2 from mode MI to mode MIII.

Sector 416 merges three-mode waveguides 400a and 400b into integral three-mode sector 417. Sector 417 is identical to sector 105 which is the main core portion where the nonlinear three-mode interaction takes place.

Sectors 418 and 419 are identical to sectors 108 and 109 of FIG. 3. In sector 418 the core narrows to the single-mode size (modes MII and MIII are cutoff).

Sector 419 is an output of nonamplifying AND element 400 and supplies serves for inputting a non-amplified output signal of this element to sector 304 of the AND gate for amplification in subsequent stages by amplifier 300.

In the integrated-optic representation both core elements of amplifier 300 and element 400 may be integrated into a single unit which is covered by a common cladding layer. A similar structure may be realized also in fiber-optic implementation.

FIG. 8—Operation of AND Gate

The AND gate of FIG. 8 operates as follows:

When a pumping pulse P enters sector 301 of amplifier 300, it propagates through the core of the amplifier in the same manner as in the two-stage OR gate of FIG. 7.

When pumping pulse P pass through sector 304, it is combined with an output signal $S_o$ of element 400. Further interaction between pump pulses P and signal $S_o$ in sectors 305 through 309 of amplifier 300 is the same as has been described with regard to the operation of the OR gate of FIG. 7.

When mode-MI signals S1 and S2 appear at input sectors 410 and 411 of non-amplifying AND element, they are converted into modes MII and MIII, respectively, in sectors 414 and 415.

Both signals are combined in sector 417 where the nonlinear three-mode interaction takes place. In contrast to main three-mode interaction sector 105 of the single-stage OR gate of FIG. 3 where interaction of modes MI and MII was accompanied by the appearance of mode MIII, the modes which interact in sector 417 are modes MII and MIII, while the accompanying mode which appears as result of such interaction is mode MI. This mode MI signal is a non-amplified output signal of element 400 and hence input signal $S_o$ of sector 304.

If at least one of signals S1 and S2 is absent, signal $S_o$ will be absent. If, however, both signals S1 and S2 are present, signal $S_o$ is of the same order as signals S1 and S2. Further propagation of signal $S_o$ after entering sector 304 has been described above. Thus, the device of FIG. 5 operates as an optical logical AND element.

By arranging the OR and AND gates in various combinations, a complete set of optical logical elements, including NOR gates, NAND gates, half-adders, adders, etc., may be obtained.

The pulse duration is the same as mentioned above. Similar to the previous embodiments, the output signal does not depend on the input signal phase.

Summary, Ramifications, Scope

Thus, I have shown a method and apparatus for optically amplifying signals without dependence of the output signal's intensity on the input-signals's phase. The device also provides an optical logical element which has the speed of operation on the order of tenth of picoseconds, which does not depend on the variation of physical conditions of circuits, which ensures independence of an output signal from the input signal's phase, which is suitable for application under real, non-laboratory conditions, and which does not require different frequencies for the signal and pump pulses.

Although the method and the optical logical devices have been shown and described in the form of specific embodiments, such as OR and AND gates, these embodiments, their parts, materials, and configurations have been given only as examples, and many other modifications of the optical amplifiers and optical logical elements are possible. For example, by conventional methods known in the art, AND and OR gates may be combined into NAND, NOR, and other gates. In FIG. 4 the elements are shown with reference to integrated-optic representation in the form of flat plates comprising an optical core sandwiched between two cladding portions. It is shown in FIG. 5 that the same principle and the waveguide with the same sectors may be embodied in fiber-optics representation where a round fiber core is surrounded by a round cladding portion. Any other structural representations are possible without the departure from the scope of the attached claims. The cladding may be made of glass, plastic, a semiconductor material, etc. Although the lengths of various sectors were given with reference to specific values, these numbers depend on specific materials of the core and cladding and can be changed with appearance of new material having different nonlinear properties. For example, with development and selection of new materials, the length of the entire waveguide may be shortened. Optical logical elements shown above may be obtained by combining other elements described in the specification than those shown in the examples. For example, an AND gate may be obtained by combining two sequentially arranged two-stage amplifiers. Such a combination also will work as an AND gate, but with a much lower efficiency. Different wavelengths of light than given in the examples can be processed. Waves of the types other than light also may be used. Therefore, the scope of the invention should be determined, not by the examples given, but by the appended claims an their legal equivalents.

What I claim is:

1. A method for converting a first optical input impulse and a second optical input impulse into a logical optical output impulse whose intensity is independent of the phases of said first optical input impulse and said second optical input impulse, comprising:
   (1) providing an optical waveguide element having a cross-sectional dimension and having:
      (a) a first input for said first optical input impulse,
      (b) a second input for said second optical input impulse,
      (c) a third input for an optical pumping impulse,
      (d) a first pulse interaction and propagation portion, and
      (e) a first impulse output,
   (2) supplying said first optical input impulse to said first input, said first optical input impulse having a first phase,
   (3) supplying said second optical input impulse to said second input, said second optical input impulse having a second phase,
   (4) supplying said optical pumping impulse to said third input, said optical pumping impulse having a third phase,
   (5) passing said first optical input impulse, said second optical input impulse, and said optical pumping impulse through said first pulse interaction and propagation portion, said first optical input impulse and said second optical input impulse being passed in a first waveguide mode, said optical pumping impulse being passed in a second waveguide mode, and
   (6) causing a nonlinear interaction in said first pulse interaction and propagation portion between said first waveguide mode and said second waveguide mode, thus generating a third waveguide mode which is phase synchronized with said first waveguide mode and said second waveguide mode so as to convert said first waveguide mode into said logical optical output impulse,
   whereby the intensity of said optical logical output impulse will be independent of said first phase and said second phase.

2. The method of claim 1, further including converting said output logical impulse into another optical output logical impulse by connecting said first pulse interaction and propagation portion to a second pulse interaction and propagation portion.

3. The method of claim 2, further including eliminating said third waveguide mode at said first impulse output by narrowing said cross-sectional dimension of said first pulse interaction and propagation portion.

4. An optical waveguide element for converting a first optical input impulse and a second optical input impulse into an optical logical output impulse having intensity independent of the phases of said first optical input impulse and said second optical input impulse, said optical waveguide element having a predetermined cross-sectional dimension and comprising:
   (a) a first input for said first optical input impulse which has a first phase,
   (b) a second input for said second optical input impulse which has a second phase,
   (c) a third input for an optical pumping impulse which has a third phase, said first optical input impulse and said second optical input impulse having a first waveguide mode and said optical pumping impulse having a second waveguide mode,
   (d) a first pulse interaction and propagation portion having said predetermined cross-sectional dimension and a refraction index sufficient for causing a nonlinear interaction between said first waveguide mode and said second waveguide mode, thereby to increase the intensity of said first mode, and generate a third waveguide mode which is phase synchronized with said first waveguide mode and said second waveguide mode, and
   (e) a first output which is connected to said first pulse interaction and propagation portion for producing said optical logical output impulse.

5. The optical waveguide element of claim 4, further including means for eliminating said second and said third waveguide modes at said first output.

6. The optical waveguide element of claim 5 wherein said means for eliminating said second and said third waveguide modes comprises a part of said first pulse interaction and propagation portion, said part having said cross-sectional dimension narrowed to the extent sufficient to cut-off said second and third waveguide modes.

7. The optical waveguide element of claim 4, further including means for converting said optical output logical impulse into another optical output logical impulse, said means for converting comprising a second common pulse interaction and propagation portion having a second output connected to said first pulse interaction and propagation portion on a side thereof opposite to said first output, said first input and said second input being connected to said second common pulse interaction and propagation portion on a side thereof opposite to said second output.

8. The optical waveguide element of claim 7, further including means for eliminating said second and said third waveguide modes at said first output, said means for eliminating said second and said third waveguide modes comprising a part of said first pulse interaction and propagation portion, said part having said cross-sectional dimension narrowed to the extent sufficient to cut-off said second and third waveguide modes.

9. An optical logical element in which output impulse intensity is independent of the phases of input impulses, said optical element having:
- a pulse interaction and propagation portion having a first input which receives a pumping impulse in a second waveguide mode and at least one additional input which receives at least one input impulse in a first waveguide mode, said pumping impulse and said one input impulse being coherent, and
- a pulse conversion portion for supplying said pumping impulse and said one input impulse to said pulse interaction and propagation portion for amplifying said one input impulse, and for generating a third waveguide mode,
- said pulse interaction and propagation portion having means for providing nonlinear interaction between said first, said second, and said third waveguide modes,
- said optical element being an optical AND gate which consists of:
  - a non-amplifying AND element having a first impulse input and a second impulse input and an impulse output which generates an output impulse of said non-amplifying AND element, said output impulse of said non-amplifying AND element being optically connected to said at least one additional input impulse, and
  - a two-stage optical amplifier which has a first amplification stage, a second amplification stage, means for eliminating said third mode located between said first amplification stage and said second amplification stage, said first amplification stage having a first pumping impulse input.

10. The optical element of claim 9 further including at least one other optical element selected from the group consisting of at least part of said AND gate and an optical OR gate, said optical OR gate having at least one stage of amplification and an impulse input portion which receives said pumping impulse and said at least one input impulse in said first waveguide mode, thereby converting said AND gate into another optical logical element.

11. A logical OR gate having a waveguide composed of a core portion and a cladding portion with a refractive index lower than that of said core portion, said logical OR gate comprising:
- a pumping impulse input for introducing a pumping impulse in a first waveguide mode,
- a core expansion portion which in addition to said first waveguide mode contains a second waveguide mode and a third waveguide mode, said first, second, and third modes being phase synchronized,
- a linear mode conversion portion for converting said pumping impulse from said first waveguide mode to said second waveguide mode,
- an impulse input portion for introducing at least two input impulses,
- a nonlinear interaction and propagation portion having a first amplification stage, a second amplification stage, and means located between said first amplification stage and said second amplification stage for eliminating said third waveguide mode, and
- an output portion for supplying a logical output impulse.

12. The optical element of claim 11 wherein said means for eliminating said third mode is a portion of said core which has a cross-sectional dimension smaller than that in said first amplification stage.

13. A logical AND gate having a waveguide composed of a core portion and a cladding portion with a refractive index lower than that of said core portion, said logical AND gate comprising:
- a pumping impulse input for introducing a pumping impulse in a first waveguide mode,
- a core expansion portion which in addition to said first waveguide mode contains a second waveguide mode and a third waveguide mode, said first, second, and third modes being phase synchronized,
- a linear mode conversion portion for converting said pumping impulse from said first waveguide mode to said second waveguide mode,
- an impulse input portion for introducing at least two input impulses, including a first impulse input and a second impulse input, and also having an impulse output which generates an output impulse comprising the AND function of said first impulse input and a second impulse input,
- a nonlinear interaction and propagation portion having a first amplification stage, a second amplification stage, and means located between said first amplification stage and said second amplification stage for eliminating said third waveguide mode, and
- an output portion for supplying a logical output impulse.

14. The optical element of claim 13 wherein said means for eliminating said third mode is a portion of said core which has a cross-sectional dimension smaller than that in said first amplification stage.

* * * * *